United States Patent
Hanes

(10) Patent No.: US 6,866,913 B2
(45) Date of Patent: *Mar. 15, 2005

(54) PROTECTION SYSTEM

(76) Inventor: Douglas Hanes, 1446 Highview Ave., Eagan, MN (US) 55121

( * ) Notice: Subject to any disclaimer, the term of this patent is extended or adjusted under 35 U.S.C. 154(b) by 319 days.

This patent is subject to a terminal disclaimer.

(21) Appl. No.: 10/152,660

(22) Filed: May 20, 2002

(65) Prior Publication Data

US 2002/0182369 A1 Dec. 5, 2002

Related U.S. Application Data

(63) Continuation-in-part of application No. 09/499,142, filed on Feb. 7, 2000, now Pat. No. 6,586,071.

(51) Int. Cl.$^7$ .................................................. B32B 3/06
(52) U.S. Cl. ........................ 428/99; 24/31; 248/205.2; 428/41.7; 428/42.3; 428/100; 428/101; 428/222; 428/223; 428/343; 428/354; 442/149
(58) Field of Search ......................... 428/99, 100, 101, 428/222, 223, 343, 354, 41.7, 42.3; 24/31; 248/205.2; 442/149

(56) References Cited

U.S. PATENT DOCUMENTS

| | | |
|---|---|---|
| 1,221,225 A | 4/1917 | Schauermann |
| 1,345,987 A | 7/1920 | Bocking |
| 1,988,377 A | 1/1935 | Fruchter .................. 45/137 |
| 3,126,666 A | 3/1964 | Petersen .................. 45/137 |
| 3,311,338 A | 3/1967 | Culley .................... 248/205 |
| 3,326,508 A | 6/1967 | Born ..................... 248/346.1 |
| 3,797,796 A | 3/1974 | Lansdowne ............ 248/346.1 |
| 4,156,048 A | 5/1979 | Davis .................... 428/354 |
| 4,421,809 A | 12/1983 | Bish et al. ................ 428/90 |
| 5,868,372 A | 2/1999 | Novak et al. ......... 248/346.11 |
| 6,195,803 B1 | 3/2001 | Russell et al. ............ 2/161.1 |
| 6,196,435 B1 | 3/2001 | Wu ........................ 224/472 |
| 6,205,686 B1 | 3/2001 | Davis ..................... 36/138 |
| 6,237,198 B1 | 5/2001 | Jimenez .................. 24/306 |
| 6,267,446 B1 | 7/2001 | Wieland et al. ....... 297/440.13 |
| 6,298,526 B1 | 10/2001 | Baumdicker et al. ..... 24/559 |
| 6,298,624 B1 | 10/2001 | Pacione .................. 52/511 |
| 6,306,477 B1 | 10/2001 | Pacione .................. 428/62 |
| 6,329,016 B1 | 12/2001 | Shepard et al. ......... 427/173 |
| 6,339,866 B1 | 1/2002 | French ................... 24/306 |
| 2002/0009568 A1 | 1/2002 | Bries et al. ............. 428/40.1 |

*Primary Examiner*—Arti R. Singh
(74) *Attorney, Agent, or Firm*—Thomas J. Nikolai; Nikolai & Mersereau, P.A.

(57) ABSTRACT

A protection system for preventing floor surfaces from becoming damaged due to the movement of furniture. The inventive device includes a piece of hook material, an adhesive strip attached to the hook material for attaching to the lower end of a leg of furniture, and a piece of felt pad having a plurality of loop members extending within for removably engaging the hook material. The hook material, and felt pad may be trimmed with a conventional cutting device to conform to the shape and size of the lower end of the furniture. The loop members are preferably inserted within the felt pad utilizing a needling or similar process.

20 Claims, 6 Drawing Sheets

PROTECTION SYSTEM

CROSS-REFERENCE TO RELATED U.S. PATENT APPLICATION

I hereby claim benefit under Title 35, United States Code, Section 120 of U.S. patent application Ser. No. 09/499,142 filed Feb. 7, 2000. This application is a continuation-in-part of the Ser. No. 09/499,142 application file date Feb. 7, 2000 now U.S. Pat. No. 6,586,071. The Ser. No. 09/499,142 application is currently pending. The Ser. No. 09/499,142 application is hereby incorporated by reference into this application.

BACKGROUND OF THE INVENTION

1. Field of the Invention

The present invention relates generally to floor protection devices and more specifically it relates to a protection system for preventing floor surfaces from becoming damaged due to the movement of furniture.

2. Description of the Prior Art

Floor protection devices have been in use for years. Typically, a floor protection device is comprised of a plastic material with an adhesive backing which is permanently secured to the ends of the legs of furniture. Conventional floor protection devices protect the floor during movement of the furniture.

The main problem within conventional floor protection devices is that they can become worn over time sometimes accumulating abrasive materials that can damage the floor. Another problem is that conventional floor protection devices are not suitable for being replaced after they become worn.

Examples of patented floor protection devices include U.S. Pat. No. 4,421,809 to Bish et al.; U.S. Pat. No. 4,156,048 to Davis; U.S. Pat. No. 3,326,508 to Born; U.S. Pat. No. 1,988,377 to Fruchter; U.S. Pat. No. 1,345,987 to Bocking; U.S. Pat. No. 5,868,372 to Novak et al.; U.S. Pat. No. 3,797,796 to Lansdowne; U.S. Pat. No. 3,311,338 to Culley; U.S. Pat. No. 3,126,666 to Petersen; U.S. Pat. No. 1,221,225 to Schauermann which are all illustrative of such prior art.

While these devices may be suitable for the particular purpose to which they address, they are not as suitable for preventing floor surfaces from becoming damaged due to the movement of furniture. Conventional floor protection devices are not designed to be replaced.

In these respects, the protection system according to the present invention substantially departs from the conventional concepts and designs of the prior art, and in so doing provides an apparatus primarily developed for the purpose of preventing floor surfaces from becoming damaged due to the movement of furniture.

SUMMARY OF THE INVENTION

In view of the foregoing disadvantages inherent in the known types of floor protection devices now present in the prior art, the present invention provides a new protection system construction wherein the same can be utilized for preventing floor surfaces from becoming damaged due to the movement of furniture.

The general purpose of the present invention, which will be described subsequently in greater detail, is to provide a new protection system that has many of the advantages of the floor protection devices mentioned heretofore and many novel features that result in a new protection system which is not anticipated, rendered obvious, suggested, or even implied by any of the prior art floor protection devices, either alone or in any combination thereof.

To attain this, the present invention generally comprises a piece of hook material, an adhesive strip attached to the hook material for attaching to the lower end of a leg of furniture, and a piece of felt pad having a plurality of loop members extending within for removably engaging the hook material. The hook material, and felt pad may be trimmed with a conventional cutting device to conform to the shape and size of the lower end of the furniture.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a protection system that will overcome the shortcomings of the prior art devices.

A second object is to provide a protection system for preventing floor surfaces from becoming damaged due to the movement of furniture.

Another object is to provide a protection system that can be replaced after they become worn or damaged.

An additional object is to provide a protection system that can be attached to various types of furniture for protecting a floor.

A further object is to provide a protection system that can be manufactured and sold at an affordable cost.

A further object is to provide a protection system that allow furniture to easily be moved upon a floor surface.

Another object is to provide a protection system that can be easily cleaned.

An additional object is to provide a protection system that can be trimmed to the appropriate size to fully protect the floor surface without being exposed.

An additional object is to provide a protection system that can be utilized to support objects that are placed upon a table for protecting the table surface.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
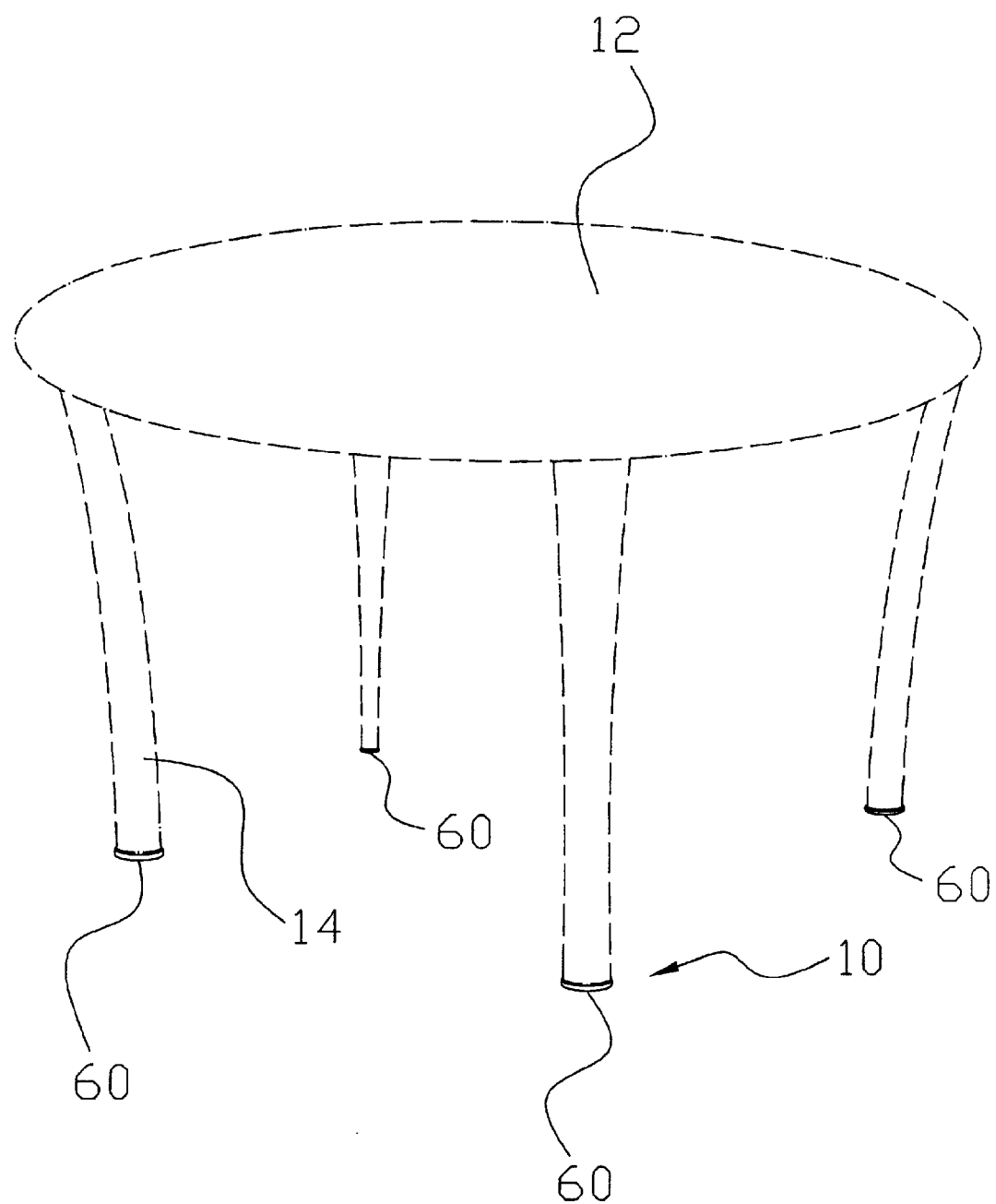
FIG. 1 is an upper perspective view of the present invention attached to the legs of a table

Turning now descriptively to the drawings, in which similar reference characters denote similar elements throughout the several views, FIGS. 1 through 6 illustrate a protection system 10, which comprises a piece of hook material, an adhesive strip 30 attached to the hook material 20 for attaching to the lower end 16 of a leg 14 of furniture 12, and a piece of felt pad 60 having a plurality of loop members 62 extending within for removably engaging the hook material 20. The hook material 20, and felt pad 60 may be trimmed with a conventional cutting device to conform to the shape and size of the lower end 16 of the furniture 12.

As shown in FIG. 1 of the drawings, furniture such as the table 12 shown often times include a plurality of legs 14 for supporting the furniture. Each of the legs 14 includes a lower end 16 that engages the floor surface. The present invention may be utilized upon various other types of furniture other than that illustrated in the drawings.

Figure 2:
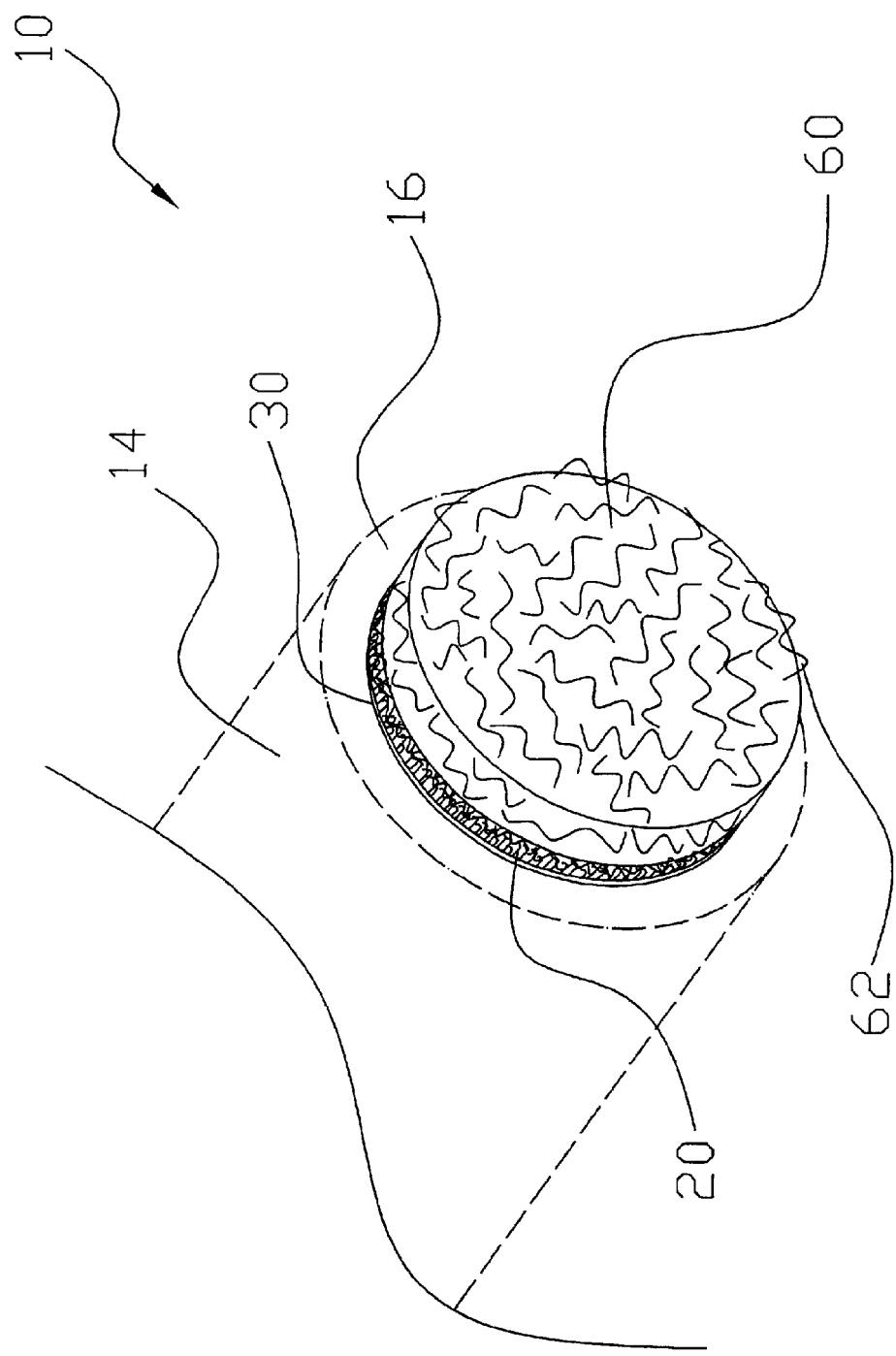
FIG. 2 is a magnified lower perspective view of the present invention secured to the end of a leg.
Figure 3:
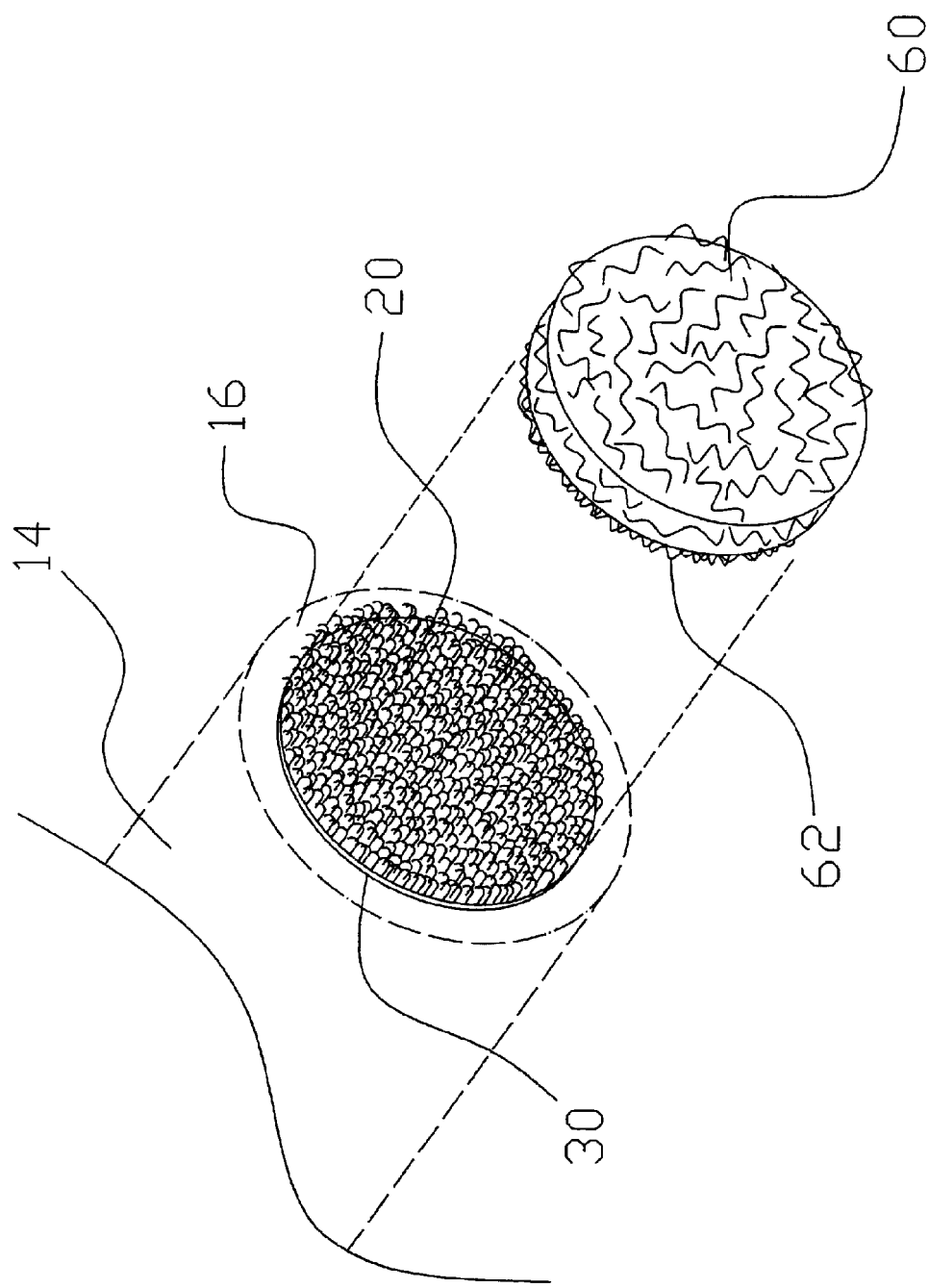
FIG. 3 is an exploded lower perspective view of the present invention with respect to the end of a leg.
Figure 4:
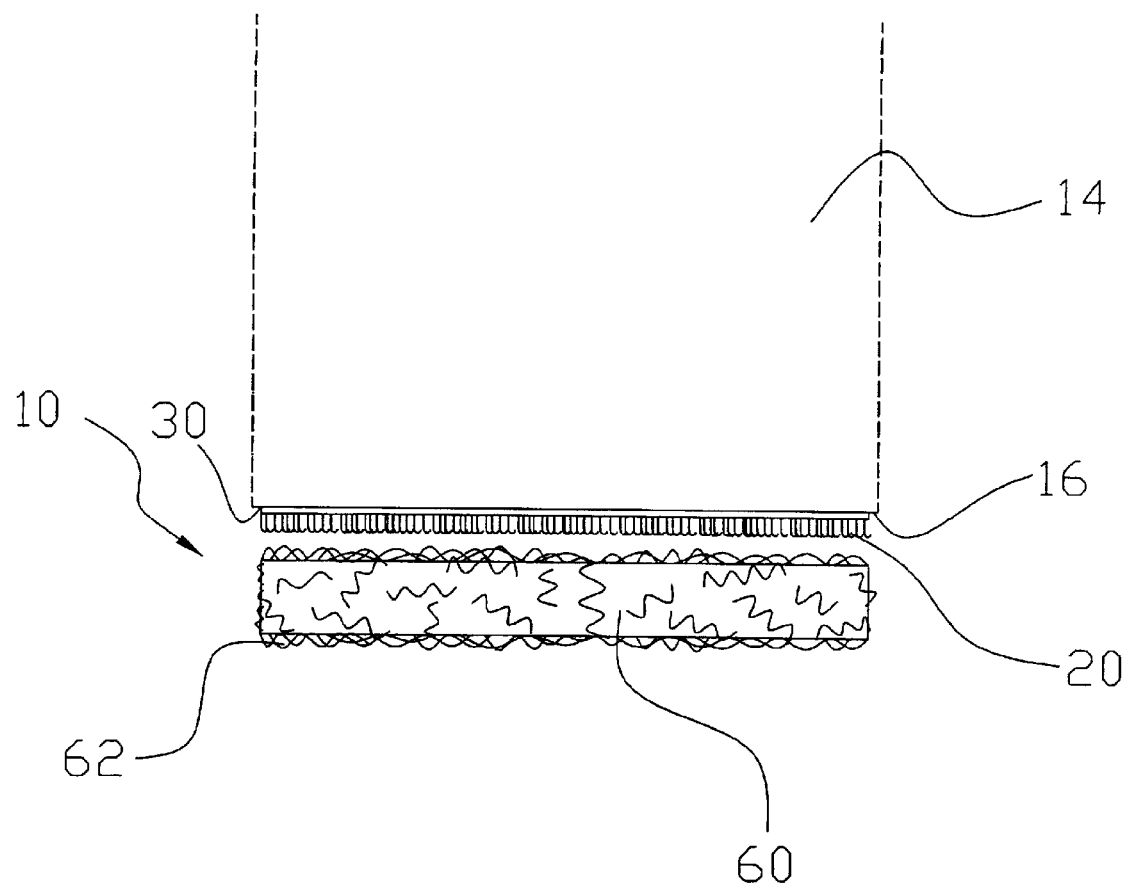
FIG. 4 is a side view of the present invention attached to a leg.

As shown in FIGS. 2 through 4 of the drawings, the present invention includes a piece of hook material 20. The piece of hook material 20 may be comprised of any well-known shape and may be trimmed to conform to the shape and size of the lower end 16 of the legs 14.

As shown in FIG. 4 of the drawings, at least one adhesive strip 30 is attached to a back side of the hook material 20 for attaching the hook material 20 to the lower end 16 of the legs 14. The adhesive strip 30 preferably includes a cover 32 that may be easily removed to expose the adhesive of the adhesive strip 30.

As shown in FIGS. 2 through 4 of the drawings, a piece of felt pad 60 having a plurality of loop members 62 is provided that may be removably attached to the hook material 20. The felt pad 60 may be trimmed to conform to the size and shape of the lower end 16 of the legs 14. The felt pad 60 may be comprised of various types of compressed fibers including synthetic fibers (e.g. polyester, etc.) or animal fibers (e.g. wool, etc.).

Figure 5:
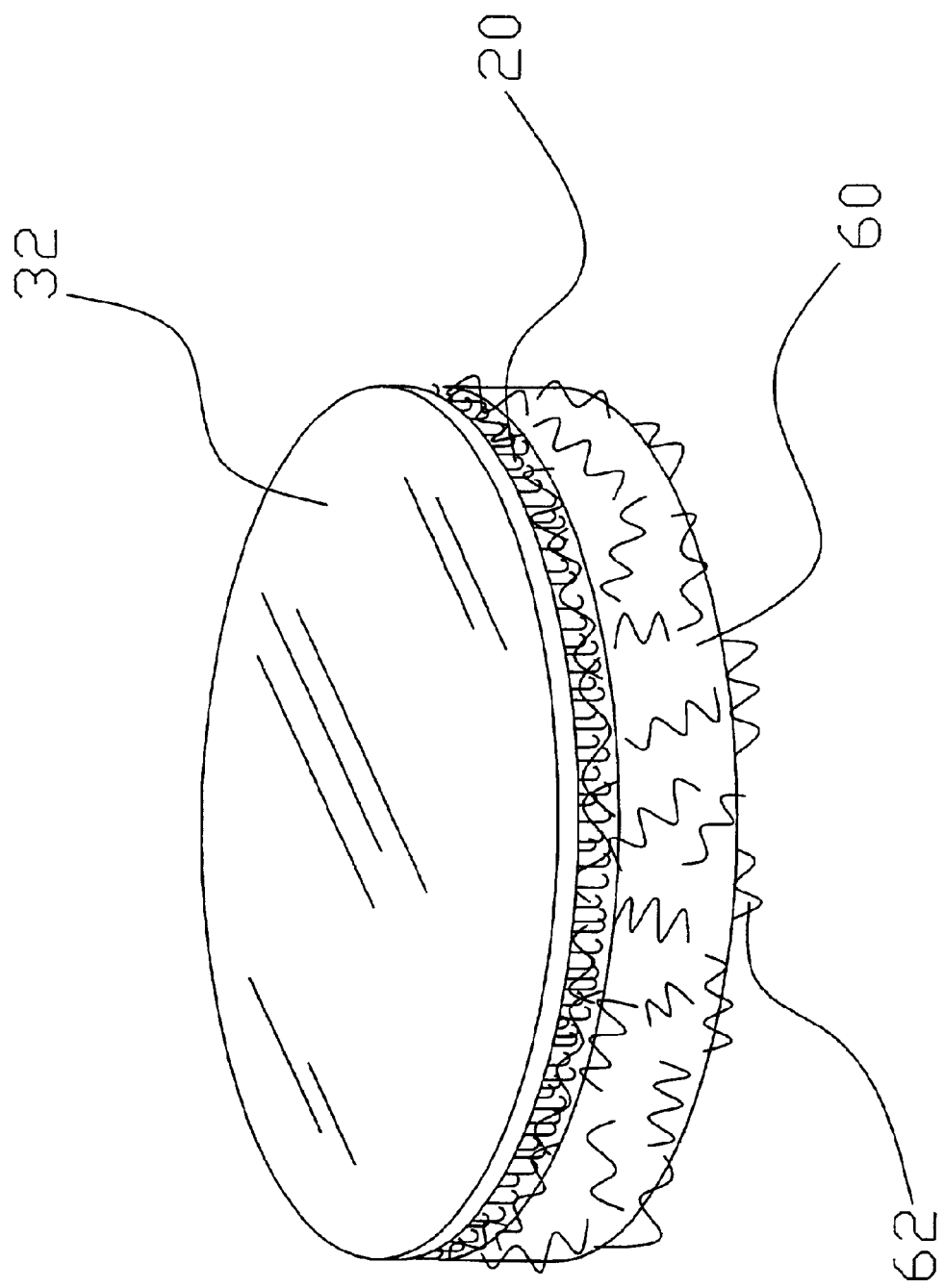
FIG. 5 is an upper perspective view of the present invention.
Figure 6:
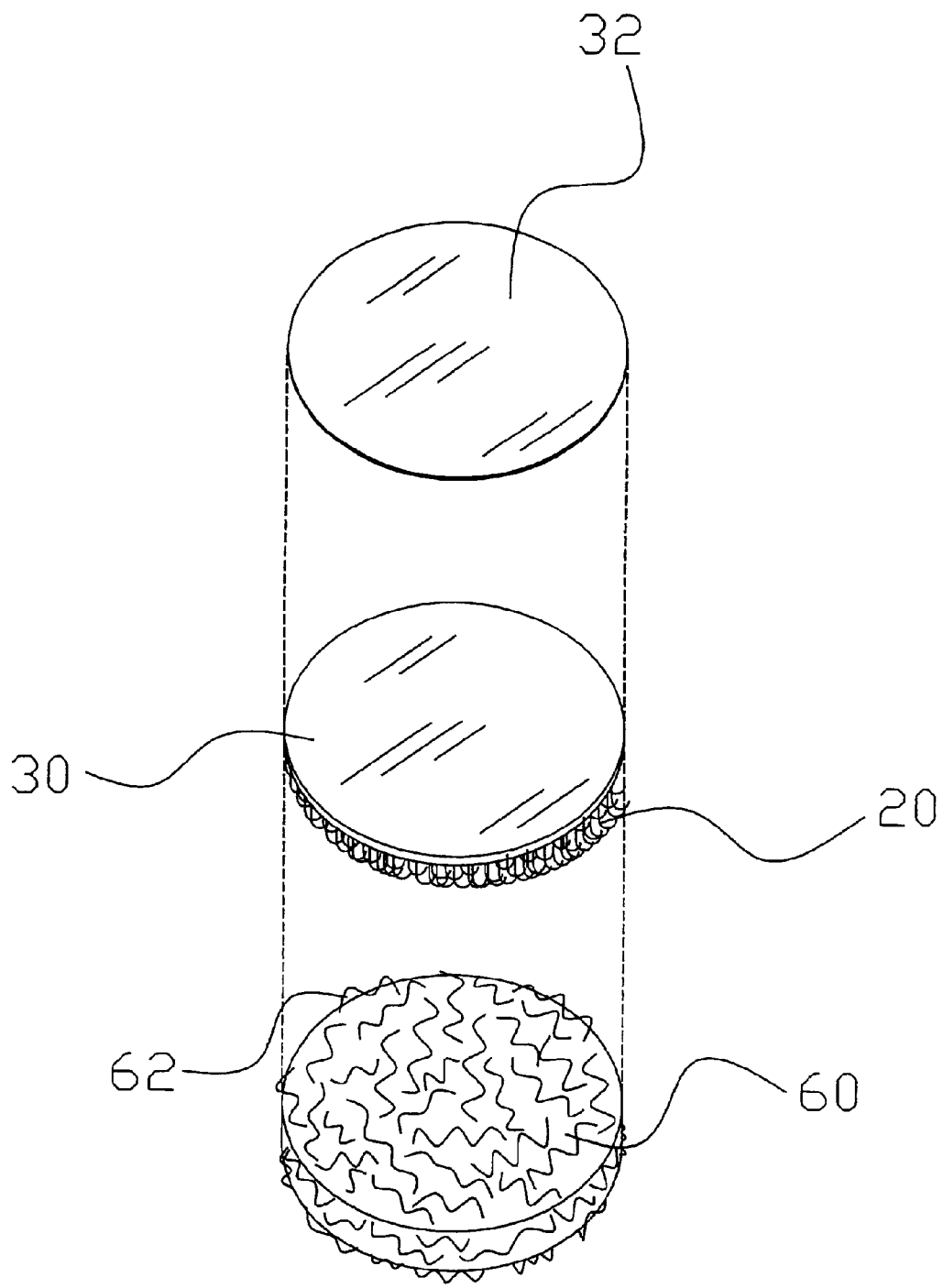
FIG. 6 is an exploded upper perspective view of the present invention.

The plurality of loop members 62 are inserted into the felt pad 60 through a needling process or other manufacturing process which also makes the felt pad 60 denser. The loop members 62 extend partially from the felt pad 60 as best illustrated in FIGS. 4 through 6 of the drawings. The loop members 62 are preferably comprised of an elongate polyester material, however various other types of materials may be utilized. The loop members 62 preferably extend about both the upper and lower surfaces and the outer perimeter of the felt pad 60 as shown in FIGS. 4 through 6 of the drawings.

In a preferred embodiment, the loop members 62 are comprised of a polyester material having a lower melting point than the material comprising the felt pad 60. After the needling of the felt pad 60 with the loop members 62, the felt pad 60 is placed within a heated environment such as an oven thereby slightly melting the loop members 62 within the felt pad 60. In an alternative embodiment not illustrated within the drawings, a protective member may be attached to the felt pad 60 opposite of the hook material 20 for providing additional protection to the floor.

In use, the user first trims the hook material 20 and the adhesive strip 30 to the appropriate size to fit upon the lower end 16 of the leg 14. In other embodiments, the hook material 20 is already formed to a desired size and shape for usage by the consumer. The user then removes a protective cover 32 from the adhesive strip 30 thereby allowing the adhesive strip 30 along with the hook material 20 to become permanently attached to the lower end 16 of the leg 14. The user then attaches the felt pad 60 with the loop members 62 to the hook material 20. The user is then able to move the furniture or other object upon a surface without fear of damaging the surface. If the felt pad 60 becomes contaminated at anytime, the user may remove the felt pad 60 for cleaning. If the felt pad 60 should become damaged, the user may simply replace the piece of felt pad 60 without damaging the lower end 16 of the legs 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Protection System

☐ ENVIRONMENTAL ELEMENTS
☐
☐
☐
☐
☐
☐
☐
☐
☐
☐ 10. Protection System
☐ 11.
☐ 12. Table
☐ 13.
☐ 14. Legs
☐ 15.
☐ 16. Lower End

| Index of Elements for Protection System |
| --- |
| ☐ 17. |
| ☐ 18. |
| ☐ 19. |
| ☐ 20. Hook Material |
| ☐ 21. |
| ☐ 22. |
| ☐ 23. |
| ☐ 24. |
| ☐ 25. |
| ☐ 26. |
| ☐ 27. |
| ☐ 28. |
| ☐ 29. |
| ☐ 30. Adhesive Strip |
| ☐ 31. |
| ☐ 32. Cover |
| ☐ 33. |
| ☐ 34. |
| ☐ 35. |
| ☐ 36. |
| ☐ 37. |
| ☐ 38. |
| ☐ 39. |
| ☐ 40. |
| ☐ 41. |
| ☐ 42. |
| ☐ 43. |
| ☐ 44. |
| ☐ 45. |
| ☐ 46. |
| ☐ 47. |
| ☐ 48. |
| ☐ 49. |
| ☐ 50. |
| ☐ 51. |
| ☐ 52. |
| ☐ 53. |
| ☐ 54. |
| ☐ 55. |
| ☐ 56. |
| ☐ 57. |
| ☐ 58. |
| ☐ 59. |
| ☐ 60. Felt Pad |
| ☐ 61. |
| ☐ 62. Loop Members |
| ☐ 63. |
| ☐ 64. |
| ☐ 65. |
| ☐ 66. |
| ☐ 67. |
| ☐ 68. |
| ☐ 69. |
| ☐ 70. |
| ☐ 71. |
| ☐ 72. |
| ☐ 73. |
| ☐ 74. |
| ☐ 75. |
| ☐ 76. |
| ☐ 77. |
| ☐ 78. |
| ☐ 79. |

I claim:

1. A protection system for protecting a floor from at least one leg of a piece of furniture, comprising:

an adhesive strip having a backing side and an adhesive side, wherein said adhesive side is attachable to a lower end of a leg of a piece of furniture;

a piece of hook material attached to said backing side; and a piece of felt pad, wherein said felt pad is removably securable to said piece of hook material.

2. The protection system of claim 1, including a protective layer attached to said felt pad opposite of said hook material.

3. The protection system of claim 1, wherein said hook material and said felt pad may be reshaped by a cutting device.

4. The protection system of claim 1, wherein said adhesive strip includes a cover removably attached to said adhesive side.

5. The protection system of claim 1, wherein said hook material extend substantially traversely from said adhesive strip.

6. The protection system of claim 1, wherein said felt pad is comprised of a synthetic material.

7. The protection system of claim 1, wherein said felt pad is comprised of a non-synthetic material.

8. The protection system of claim 1, wherein said felt pad has a circular shape.

9. The protection system of claim 1, wherein said felt pad is comprised of a polyester material.

10. The protection system of claim 1, hook material has a circular shape.

11. A protection system for protecting a floor from at least one leg of a piece of furniture, comprising:

an adhesive strip having a backing side and an adhesive side, wherein said adhesive side is attachable to a lower end of a leg of a piece of furniture;

a piece of hook material attached to said backing side; and a piece of felt pad; and a plurality of loop members extending within said felt pad for removably connecting to said hook material.

12. The protection system of claim 11, wherein said plurality of loop members are needled within said felt pad.

13. The protection system of claim 11, wherein said plurality of loop members comprised of a polyester material.

14. The protection system of claim 11, wherein said adhesive strip includes a cover removably attached to said adhesive side.

15. The protection system of claim 11, wherein said plurality of loop members comprised of a first polyester material having a first melting point and wherein said felt pad is comprised of a material having a second melting point, wherein said first melting point is less than said second melting point.

16. The protection system of claim 11, wherein said felt pad is comprised of a synthetic material.

17. The protection system of claim 11, wherein said felt pad is comprised of a non-synthetic material.

18. The protection system of claim 11, wherein said felt pad has a circular shape.

19. The protection system of claim 11, wherein said felt pad is comprised of a polyester material.

20. The protection system of claim 11, hook material has a circular shape.

* * * * *